(12) United States Patent
Nagao et al.

(10) Patent No.: US 10,803,858 B2
(45) Date of Patent: Oct. 13, 2020

(54) SPEECH RECOGNITION APPARATUS, SPEECH RECOGNITION METHOD, AND COMPUTER PROGRAM PRODUCT

(71) Applicant: Kabushiki Kaisha Toshiba, Tokyo (JP)

(72) Inventors: Manabu Nagao, Kanagawa (JP); Hiroshi Fujimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 15/686,410

(22) Filed: Aug. 25, 2017

(65) Prior Publication Data

US 2018/0137863 A1 May 17, 2018

(30) Foreign Application Priority Data

Nov. 11, 2016 (JP) .................................. 2016-220855

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G10L 15/08* (2013.01); *G10L 15/26* (2013.01);
(Continued)

(58) Field of Classification Search
CPC ......... G10L 15/02; G10L 15/08; G10L 15/16; G10L 15/22; G10L 15/26; G10L 2015/226
See application file for complete search history.

(56) References Cited

U.S. PATENT DOCUMENTS 6,574,595 B1   6/2003   Mitchell et al.
7,103,543 B2   9/2006   Hernandez-Abrego et al.
(Continued)

FOREIGN PATENT DOCUMENTS

JP   2005-500580   1/2005
JP   3678421   5/2005
(Continued)

OTHER PUBLICATIONS

Yu Nasu et al. "Acoustic event detection and removal using LSTM-CTC for speech recognition" The Institute of Electronic Information and Communication Engineers IEICE Technical Report, vol. 116, No. 208, (Sep. 2016), pp. 121-126.
(Continued)

*Primary Examiner* — Angela A Armstrong
(74) *Attorney, Agent, or Firm* — Finnegan, Henderson, Farabow, Garrett & Dunner, L.L.P.

(57) ABSTRACT

According to an embodiment, a speech recognition apparatus includes a calculation unit that calculates, based on a speech signal, a score vector sequence including score vectors including an acoustic score for each of input symbols, a search unit that generates an input symbol string by searching for a path of the input symbol tracing the acoustic score having a high likelihood in the score vector sequence and that generates an output symbol representing a recognition result of the speech signal based on a recognition target symbol representing linguistic information as a recognition target among the input symbols, an additional symbol acquisition unit that obtains an additional symbol representing paralinguistic information and/or non-linguistic information from among the input symbols included in a range corresponding to the output symbol, and an output unit that outputs the output symbol and the obtained additional symbol in association with each other.

18 Claims, 8 Drawing Sheets

(51) Int. Cl.
*G10L 15/26* (2006.01)
*G10L 15/08* (2006.01)
G10L 15/16 (2006.01)

(52) U.S. Cl.
CPC ........ G10L 15/16 (2013.01); *G10L 2015/226* (2013.01)

(56) References Cited

U.S. PATENT DOCUMENTS

| | | |
|---|---|---|
| 7,464,031 B2 | 12/2008 | Axeirod et al. |
| 7,711,560 B2 | 5/2010 | Yamada et al. |
| 8,972,243 B1 * | 3/2015 | Strom .................. G10L 15/193 704/1 |
| 10,002,608 B2 * | 6/2018 | Bangalore ........... G10L 15/1807 |
| 2014/0337031 A1 | 11/2014 | Kim et al. |
| 2015/0179166 A1 | 6/2015 | Nagao |
| 2015/0220074 A1 | 8/2015 | Nagao |

FOREIGN PATENT DOCUMENTS

| | | |
|---|---|---|
| JP | 2005-15572 | 6/2005 |
| JP | 2005-165272 | 6/2005 |
| JP | 2015-121709 | 7/2015 |
| JP | 2015-143800 | 8/2015 |
| JP | 2016-526178 | 9/2016 |

OTHER PUBLICATIONS

Hiroya Fujisaki, "Computing PROSODY Computational Models for Processing Spontaneous Speech" ISBN-13.978-1461274788, (1997), pp. 28-29, New York.

Yichuan Tang, "Deep Learning using Linear Support Vector Machines" arXiv:1306.0239v4, (Feb. 2015), 6 pages.

Alex Graves et al., "Towards End-to-End Speech Recognition with Recurrent Neural Networks" International Conference on Machine Learning, (2014), vol. 32 Beijing, China, pp. 1764-1772.

Dario Amodei et al., "Deep Speech 2: End-to-end Speech Recognition in English and Mandarin", arXiv:1512. 02595v1 (2015).

Yang Liu et al., "Enriching Speech Recognition with Automatic Detection of Sentence Boundaries and Disfluencies" IEEE Transactions on Audio, Speech, and Languange Processing, (Sep. 2006) vol. 14, pp. 1-15.

Yu Abe et al., Improvement of Filler Detection Using Prosodic Features in Spontaneous Speech Recognition, IPSJ SIG Technical Report 2006-SLP-60(9), pp. 43-48, (2006).

* cited by examiner

DELETE      DELETE
↓            ↓

DELETE DELETE DELETE DELETE DELETE DELETE DELETE DELETE

ε ε a ε \<f\> ε ε h\<f\> ε ε g ε ε \<g\> ε g ε o ε ε ε o ε d ε \<q\> ε ε ε

⇩ a    h    g    g  o    o  d

FIG.8 ahggood

⇩

$h_1$=ah, $h_2$=g, $h_3$=good

- ah: 1-12
- g: 13-18
- good: 19-32

FIG.10

$h_1$=ah, $h_2$=g, $h_3$=good
$p_1$={<f>}, $p_2$={<g>}, $p_3$={<q>}

FIG.11

```
1      ξ ← ξ initial
2      for I from 1 to N
3          v ← extract_features(f_I)
4          s ← calc_scores(v)
5          ξ ← search(ξ, s)
6      h ← best(ξ)
7      Ψ ← ∅
8      for i from 1 to |h|
9          A ← ∅
10         π ← get_symbol_sequence(h_i)
11         foreach σ ∈ (R∖L)
12             if σ ∈ π
13                 A ← A∪{σ}
14         Ψ ← Ψ∪{(i, A)}
15     return (h, Ψ)
```

C  $h_1$=ah, $h_2$=g, $h_3$=good

FIG.13

```
1      ξ ← ξ initial
2      for i from 1 to N
3          v ← extract_features(f_i)
4          s ← calc_scores(v)
5          ξ ← search(ξ, s)
6      h ← best(ξ)
7      Ψ ← ∅
8      for i from 1 to |h|
9          A ← ∅
10         π ← get_symbol_sequence(h_i)
11         foreach σ ∈ (R\L)
12             c ← 0, d ← 0
13             for j from 1 to |π|
14                 if π_j = σ
15                     c ← c+1
16                 if π_j ∈ L
17                     d ← d+1
18             if c > 0
19                 A ← A ∪ {(σ, c/d)}
20         Ψ ← Ψ ∪ {(i, A)}
21     return (h, Ψ)
```

FIG.14

```
1      ξ ← ξ initial
2      for i from 1 to N
3          v ← extract_features(f_i)
4          s ← calc_scores(v)
5          ξ ← search(ξ, s)
6      h ← best(ξ)
7      Ψ ← ∅
8      for i from 1 to |h|
9          A ← ∅
10         π ← get_symbol_sequence(h_i)
11         foreach σ ∈ (R\L)
12             for j from |π| to 1
13                 if π_j ∈ L
14                     break
15                 if π_j = σ
16                     A ← A ∪ {σ}
17         Ψ ← Ψ ∪ {(i, A)}
18     return (h, Ψ)
```

SPEECH RECOGNITION APPARATUS, SPEECH RECOGNITION METHOD, AND COMPUTER PROGRAM PRODUCT

CROSS-REFERENCE TO RELATED APPLICATIONS

This application is based upon and claims the benefit of priority from Japanese Patent Application No. 2016-220855, filed on Nov. 11, 2016; the entire contents of which are incorporated herein by reference.

FIELD

Embodiments described herein relate generally to a speech recognition apparatus, a speech recognition method, and a computer program product.

BACKGROUND

There is a known acoustic model capable of evaluating a filler, stammering, or the like, simultaneously with linguistic information. Since a speech recognition system using such an acoustic model is capable of performing speech recognition by removing fillers, stammering, or the like, it is possible to enhance recognition accuracy.

In the case of removing the filler and stammering, however, an application using a recognition result has difficulty in detecting a word to which the filler or stammering, or the like, was attached. Accordingly, the application using the speech recognition result had difficulty in performing information processing using a filler, stammering, or the like.

BRIEF DESCRIPTION OF THE DRAWINGS

FIG. 5 is a diagram illustrating an exemplary alphabetical input symbol string;

FIG. 6 is a diagram illustrating processing of deleting consecutive recognition target symbols from the input symbol string in FIG. 5;

FIG. 7 is a diagram illustrating processing of deleting an item other than the recognition target symbol from the input symbol string in FIG. 6;

FIG. 8 is a diagram illustrating processing of generating an alphabetical output: symbol;

FIG. 9 is a diagram illustrating a range corresponding to an output symbol in an alphabetical input symbol string;

FIG. 10 is a diagram illustrating an exemplary alphabetical output symbol and additional symbol;

FIG. 11 is a diagram illustrating a pseudo code representing processing by a speech recognition apparatus according to a first modification example;

FIG. 12 is a diagram illustrating an exemplary alphabetical symbol recognized by a pseudo code;

FIG. 13 is a diagram illustrating a pseudo code representing processing by a speech recognition apparatus according to a second modification example;

FIG. 14 is a diagram illustrating a pseudo code representing processing by a speech recognition apparatus according to a fourth modification example.

DETAILED DESCRIPTION

Figure 1:
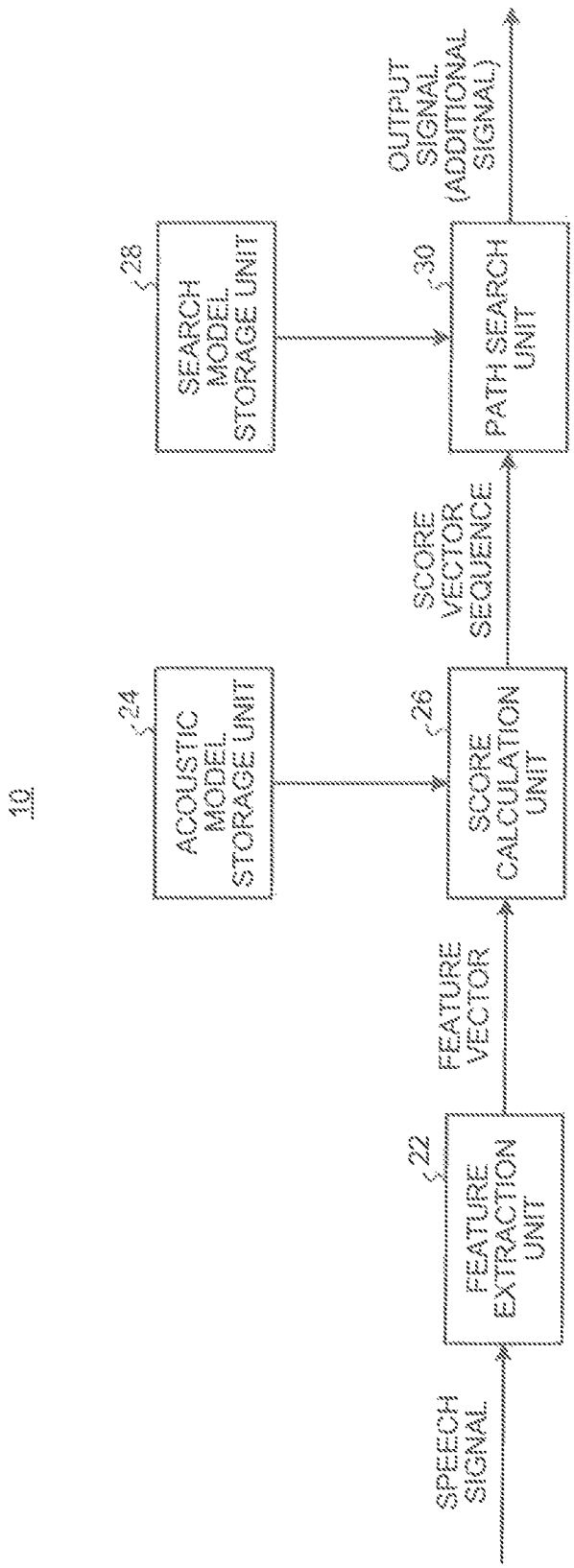
FIG. 1 is a diagram illustrating a configuration of a speech recognition apparatus according to an embodiment.

According to an embodiment, a speech recognition apparatus includes one or more processors. In the speech recognition apparatus, the processors are configured to calculate, based on a speech signal, a score vector sequence including a plurality of score vectors including an acoustic score for each of input symbols as an element of a predetermined symbol set being arranged. The processors are configured to generate an input symbol string by searching for a path of the input symbol tracing the acoustic score having a high likelihood in the score vector sequence and configured to generate an output symbol representing a recognition result of the speech signal based on a recognition target symbol representing linguistic information as a recognition target among the input symbols included in the input symbol string. The processors are configured to obtain an additional symbol representing paralinguistic information and/or non-linguistic information from among the input symbols included in a range corresponding to the output symbol in the input symbol string. And, the processors are configured to output the output symbol and the obtained additional symbol in association with each other.

Hereinafter, embodiments will be described in detail with reference to the drawings. A speech recognition apparatus 10 according to the present embodiment recognizes linguistic information included in a speech signal and outputs an output symbol representing linguistic information obtained by the recognition. Together with this, the speech recognition apparatus 10 recognizes paralinguistic information and/or non-linguistic information included in the speech signal accompanying the linguistic information, and outputs an additional symbol representing the recognized paralinguistic information and/or non-linguistic information in association with the output symbol.

Definition

First, terms used in the embodiments will be described.

Acoustic information is information included in a speech signal. The acoustic information includes linguistic information, paralinguistic information, non-linguistic information, and silence information.

The linguistic information among acoustic information is information that can be represented by a text and that has been added to a speech signal by utterance of a language by a speaker. For example, the linguistic information is a phoneme, a syllable, a phoneme grouped by a mora unit, a subword, a text, a word, or the like. In the case of Japanese, the linguistic information may be a kana character. Moreover, in the case of English, the linguistic information may be a phonetic symbol or an alphabet. Silence that can be linguistic information, such as Japanese geminate consonant is included in this category.

The paralinguistic information among acoustic information is information that cannot be identified from the linguistic information and that has been added to the speech signal by utterance of a speaker. The paralinguistic information is information for identifying, for example, a filler indicating that the speaker is thinking, and whether linguistic information represented by the direction of intonation is a question to another party, or the like. For example, in a case where the latter half of the linguistic information "Sou desu ka (It is so)" is spoken with rising intonation, the linguistic information represents that it is a question. In contrast, in a case where the latter half of the linguistic information "Sou desu ka (It is so)" is spoken with failing intonation, the linguistic information indicates affirmation. That is, paralinguistic information representing a question indicates, for example, that the intonation of the latter half of the linguistic information is spoken with rising intonation. The paralinguistic information is not limited to the filler and question, but may further represent other information.

The non-linguistic information among acoustic information is information representing a feature of the speaker, included in the speech signal. For example, the non-linguistic information is information such as gender of the speaker, age of the speaker, a physical feature of the speaker, personality of the speaker, emotion of the speaker, stammering, word fragments, and rephrasing. Note that the non-linguistic information may be, for example, other information uncontrollable by the speaker and information representing a state, or the like, of the speaker, as long as the information represents a feature of the speaker.

The silence information among acoustic information is information representing a state (for example, silence and noise) where the speech signal does not include any of linguistic information, paralinguistic information, and non-linguistic information.

An input symbol is a symbol representing acoustic information. A symbol set is a set having the input symbol as an element. The symbol set is predefined. The symbol set includes as input symbols at least one recognition target symbol, at least one additional symbol, and a non-target symbol.

The recognition target symbol among the input symbol is a symbol representing linguistic information as a recognition target. The symbol set may include texts (for example, all phonetic symbols) corresponding to all linguistic information that can be included in the speech signal, as recognition target symbols. Moreover, in a case where the speech recognition apparatus 10 recognizes solely a specific word (for example, in a case where only "konnichiwa (hello)" is recognized), a text corresponding to linguistic information necessary for recognizing the specific word may be included as the recognition target symbol. In a case where silence information is recognized, it is allowable to include, in a recognition target symbol, a silence symbol representing silence information, as a recognition target symbol.

The additional symbol among the input symbol is a symbol representing paralinguistic information and/or non-linguistic information. The symbol set may include texts corresponding to all paralinguistic information and non-linguistic information that can be included in the speech signal, as additional symbols. Moreover, in a case where the speech recognition apparatus 10 recognizes solely specific paralinguistic information or non-linguistic information (for example, in a case where solely a filler is recognized), it is allowable to include texts corresponding to specific paralinguistic information or non-linguistic information, as additional symbols.

The non-target symbol among the input symbol is a symbol indicating that which acoustic information of the acoustic information represented by the recognition target symbol and the acoustic information represented by the additional symbol is included in the speech signal is undetermined. That is, the non-target symbol is a symbol representing that the speech recognition apparatus 10 cannot yet recognize the recognition target symbol or the additional symbol. More specifically, the non-target symbol is a symbol representing that a score calculation unit 26 to be described below is suspending processing of determining which recognition target symbol or additional symbol is going to have a better score. The acoustic score of the non-target symbol becomes better when processing is suspended and the score becomes worse when processing is not suspended. Accordingly, in a case where the score of the non-target symbol calculated when speech of one frame to be described below is good, the speech may correspond to a portion or all of silence information, linguistic information as a recognition target, linguistic information as a non-recognition target, paralinguistic information as a recognition target, paralinguistic information as non-recognition target, non-linguistic information as a recognition target, and non-linguistic information as a non-recognition target.

The input symbol, string is as input symbol sequence with a high likelihood, obtained by recognizing a speech signal. The speech recognition apparatus 10 may generate one input symbol string for one speech signal. Moreover, the speech recognition apparatus 10 may generate M input symbol strings (M is an integer of two or more, for one speech signal.

The output symbol represents a recognition result, of the speech signal. The output symbol may be a word, a text, a subword string, or the like. The output symbol is generated based on the recognition target symbol included in the input symbol string. The speech recognition apparatus 10 may generate a plurality of output symbols arranged in time series from one input symbol string. The plurality of output symbols arranged in time series are referred, to as an output symbol string in some cases.

Embodiment

FIG. 1 is a diagram illustrating a configuration of the speech recognition apparatus 10 according to an embodiment. The speech recognition apparatus 10 includes a feature extraction unit 22, an acoustic model storage unit 24, a score calculation unit 26, a search model storage unit 28, and a path search unit 30.

The feature extraction unit 22 obtains a speech signal as a recognition target. The feature extraction unit 22 obtains a speech signal detected by a sound collection device, for example.

The feature extraction unit 22 analyzes a speech signal for each of the frames and calculates a feature vector for each of the frames. The feature vector includes a plurality of types of feature data representing features of the speech. A frame is a segment of a speech signal for calculating one feature vector. The frame is set such that the center time is shifted at predetermined intervals. Moreover, the plurality of frames has a same time length, for example. Each of the frames may be partially overlapped with another frame.

The acoustic model storage unit 24 stores an acoustic model. The acoustic model is data used by the score calculation unit 26 for pattern recognition of the speech signal. The acoustic model is appropriately trained by a learning device prior to recognition of the speech signal by the speech recognition apparatus 10. The acoustic model storage unit 24 may be realized by a server on a network, for example.

Based on the feature vector calculated for each of the frames by the feature extraction unit 22, the score calculation unit 26 calculates a score vector sequence having a plurality of score vectors being arranged, by using the acoustic model stored in the acoustic model storage unit 14, Each of the score vectors includes an acoustic score for each of the input symbols as elements of a predetermined symbol set.

Each of the acoustic scores included in the score vector corresponds so any of the input symbols. The acoustic score represents the likelihood of that the acoustic information represented by the corresponding input symbol is included in the speech signal. Note that the acoustic information included in the speech signal and the acoustic information represented by the input symbol need not be frame synchronized (time synchronized). That is, the acoustic information represented by the input symbol may be delayed from the acoustic information included in the speech signal. For example, it is allowable to include the acoustic information represented by the input symbol corresponding to the best acoustic score among the acoustic scores included in the score vector calculated by the score calculation unit 26 by input of the feature vector of the 15th frame, in the first to tenth frames.

The score vector is normalized so as to be a specific value (one, for example) in a case where all included acoustic scores are composed. For example, in a case where the acoustic score is probability or likelihood, the score vector is normalized so as to be a specific value as a result of summing ail included acoustic scores. Moreover, in a case where the acoustic score is a logarithmic probability or a logarithmic likelihood, the score vector is normalized so as to be a specific value as a result of performing exponential operation on each of the included acoustic scores and then summing all the acoustic scores.

For example, the acoustic score may be such that she acoustic information represented by the corresponding input symbol is one of the probability, the likelihood, the logarithmic likelihood, and she logarithmic probability, included in the speech signal. The acoustic score may be configured to indicate that the larger the value, the better (that is, having high likelihood), or to indicate that the smaller the value, the better. For example, in a case where the acoustic score is one of probability, likelihood, logarithmic probability, and logarithmic likelihood, the acoustic score indicates that the larger the value, the better. Moreover, for example, in a case where the acoustic score is a logarithmic probability obtained by inverting the sign, or a logarithmic likelihood obtained by inverting the sign, the acoustic score indicates that the smaller the value, the better. Moreover, in a case where a certain distance between the speech signal (feature vector) and the acoustic model is defined as the acoustic score, the acoustic score indicates that the smaller the value, the better.

The score vector sequence is information having a plurality of score vectors being arranged. The score calculation unit 26 provides a calculated score vector sequence to the path search unit 30. Note that each of the feature extraction unit 22 and the score calculation unit 26 corresponds to a calculation unit that calculates a score vector sequence based on the speech signal.

The search model storage unit. 28 stores a search model. The search model is data used by the path search unit 30 to generate an input symbol string and an output symbol string from the score vector sequence. The search model is appropriately trained by a learning device prior to recognition of the speech signal by the speech recognition apparatus 10. The search model storage unit 28 may be realized by a server on a network, for example.

The path search unit 30 searches for an input symbol path tracing the acoustic score having a high likelihood in the score vector sequence calculated by the score calculation unit 26, thereby generating an input symbol string. Furthermore, the path search unit 30 generates an output symbol representing a recognition result of the speech signal based on the recognition target symbol representing the linguistic information as the recognition target among the input symbols included in the input symbol string. The path search unit 30 may generate the input symbol string and the output symbol using the search model stored in the search model storage unit 28. The input symbol path is an input symbol sequence selected for each of the score vectors. In a case where the number of elements of the symbol set is x and the length of the score vector sequence is y, the number of possible combinations of input symbol path would be $x^y$. The path search unit 30 may store the input symbol path as it is as an input symbol sequence or may store it indirectly with reference to the search model.

Furthermore, the path search unit 30 obtains an additional symbol representing paralinguistic information and/or non-linguistic information from the input symbol included in the range corresponding to the output symbol in the input symbol string. Then, the path search unit 30 outputs the output symbol and the obtained additional symbol in association with each other.

Figure 2:
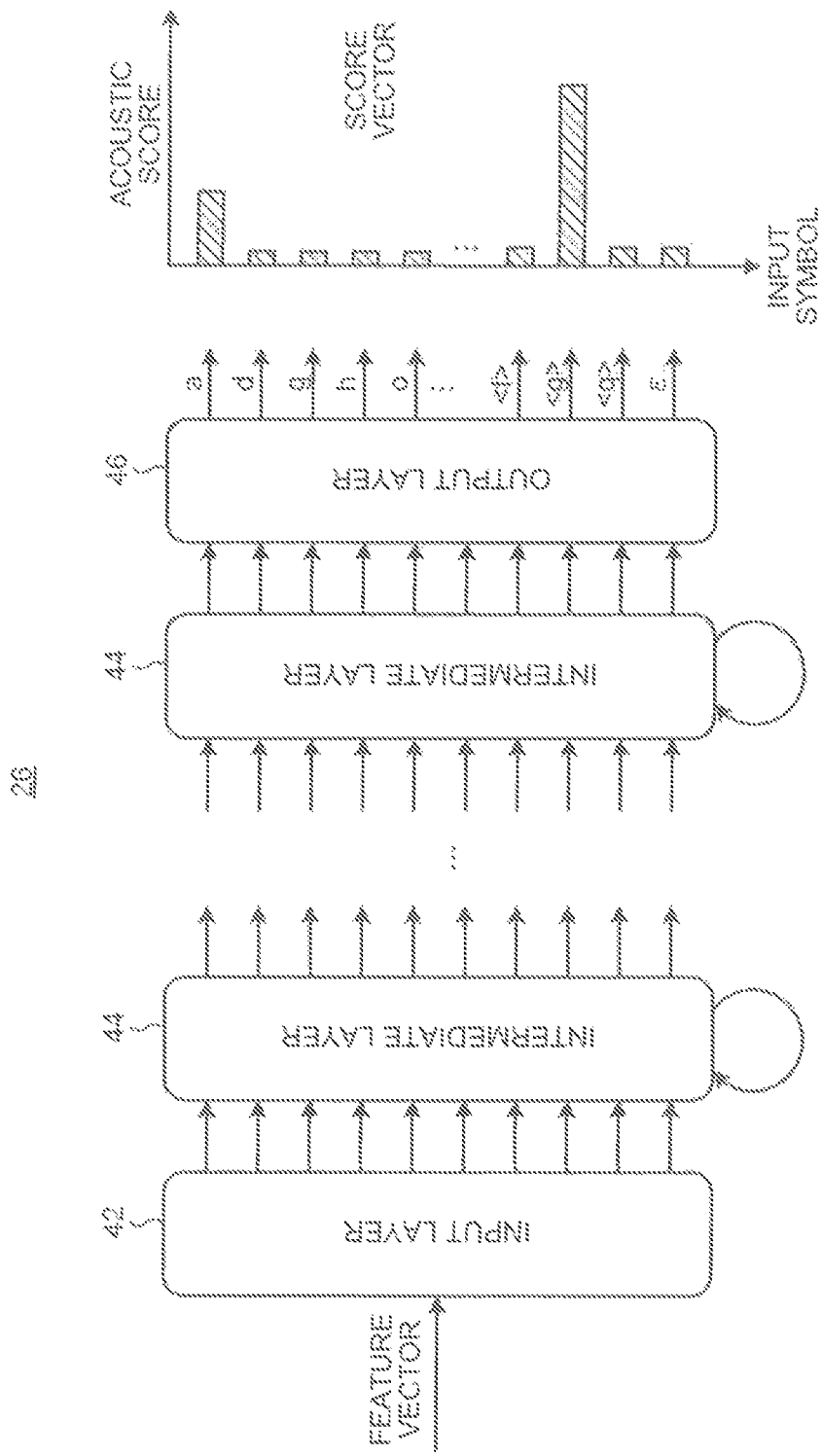
FIG. 2 is a diagram illustrating an exemplary configuration of a score calculation unit.

FIG. 2 is a diagram illustrating an exemplary configuration of the score calculation unit 26. The score calculation unit 26 may be, for example, a recurrent neural network (RNN) that employs a connectionist temporal classification method (CTC) as illustrated in FIG. 2.

For example, the score calculation unit 26 includes an input layer 42, at least one intermediate layer 44, and an output layer 46. Each of the input layer 42, the intermediate layer 44, and the output layer 46 executes acquisition processing on at least one signal, arithmetic processing on the obtained signal, and output processing on at least one signal, respectively.

The input layer 42, the at least one intermediate layer 44, and the output layer 46 are connected in series. The input layer 42 receives a feature vector and executes arithmetic processing. Then, the input layer 42 outputs at least one signal obtained as a calculation result to the intermediate layer 44 of the next stage. Moreover, each of the intermediate layers 44 executes arithmetic processing on at least one signal received from the preceding stage. Then, each of the intermediate layers 44 outputs at least one signal obtained as a calculation result to the intermediate layer 44 of the next stage or to the output layer 46. Furthermore, each of the intermediate layers 44 may have a return path shat feeds back the signal to oneself.

The output layer 46 executes arithmetic processing on the signal received from the intermediate layer 44 on the preceding stage. Then, the output layer 46 outputs a score vector as a calculation result. The output layer 46 outputs signals corresponding to the number of input symbols. In the output layer 46, the signal to be output is associated with each of the input symbols. For example, the output layer 46 executes arithmetic operation using a softmax function.

Moreover, parameters used by individual layers for arithmetic processing are provided from the acoustic model stored in the acoustic model storage unit 24. The acoustic model is trained in advance by the learning device so as to output the acoustic scores of the individual input symbols included in the predetermined symbol set based on the feature vector. That is, the acoustic model is trained by the learning device so as to output acoustic scores for each of at least one recognition target symbol representing linguistic information as a recognition target, at least one additional symbol representing paralinguistic information and/or non-linguistic information, and non-target symbol representing acoustic score as a non-recognition target.

With this configuration, the score calculation unit 26 can simultaneously output the acoustic scores of the each of the input symbols included in the symbol set. That is, the score calculation unit 26 can simultaneously output the acoustic scores for each of the recognition target symbol, the additional symbol, and the non-target symbol.

Note that the score calculation unit 26 may be a network referred to as long/short term memory (Long Short-term Memory) as expanded RNN, instead of RNN. Moreover, a support vector machine may be used for the output layer 46 (for example, Yichuan Tang, "Deep Learning using Linear Support Vector Machines", arXiv:1306.0239v4 [cs.LG] 21, Feb. 2015) instead of the softmax function.

Figure 3:
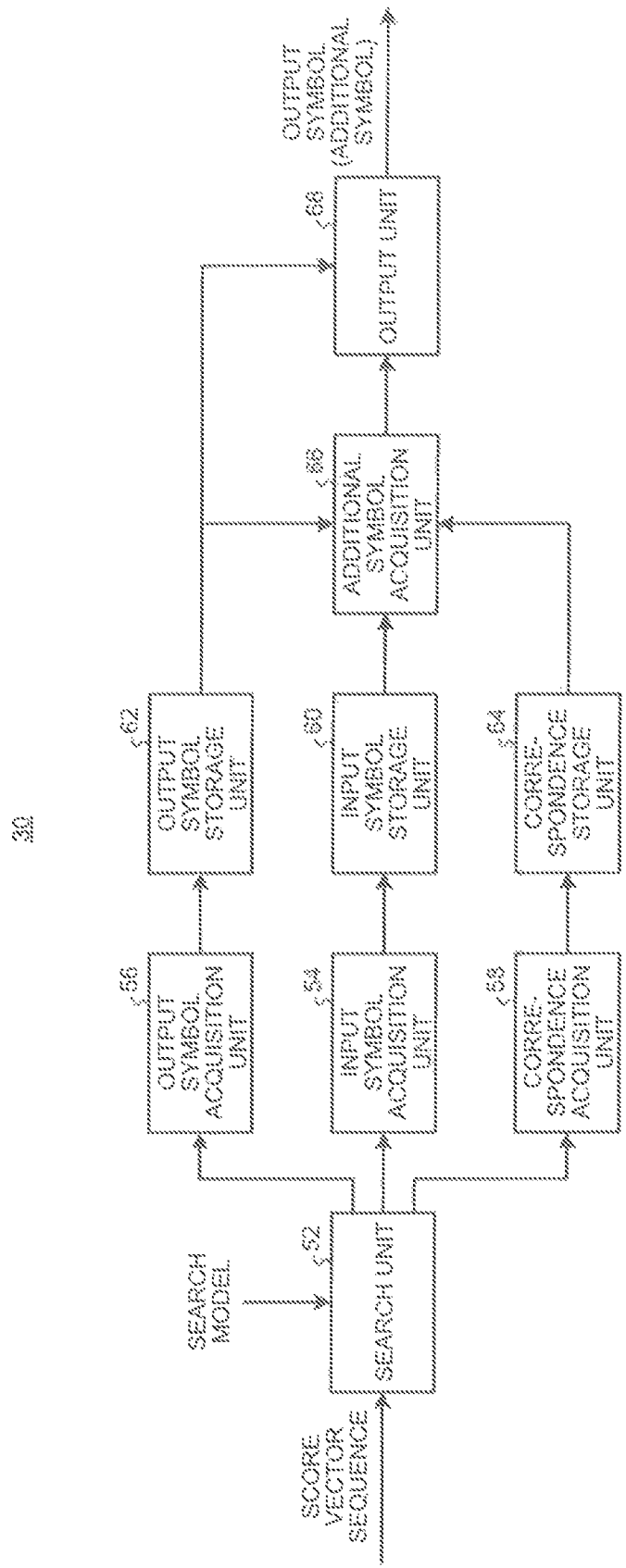
FIG. 3 is a diagram illustrating a configuration of a path search unit.

FIG. 3 is a diagram illustrating a configuration of the path search unit 30. The path search unit 30 includes a search unit 52, an input symbol acquisition unit 54, an output symbol acquisition unit 56, a correspondence acquisition unit 58, an input symbol storage unit 60, an output symbol storage unit 62, a correspondence storage unit 64, an additional symbol acquisition unit 66, and an output unit 68.

The search unit 52 searches for an input symbol path tracing the acoustic score having a high likelihood in the score vector sequence calculated by the score calculation unit 26, thereby generating an input symbol string. Furthermore, the search unit 52 generates an output symbol representing a recognition result of the speech signal, based on the recognition target symbol representing the linguistic information as the recognition target among the input symbols included in the input symbol string. The search unit 52 may generate the input symbol string using the search model stored in the search model storage unit 28. Moreover, the search unit 52 may generate an output symbol using the search model.

Moreover, the search unit 52 may generate the output symbol based on the input symbol string after generating the input symbol string. Moreover, the search unit 52 may collectively generate an input symbol string and an output symbol. Moreover, the search unit 52 may generate one input symbol string, or may generate M input symbol strings. Moreover, the search unit 52 may generate one output symbol from each of the input symbol strings, or may generate a plurality of output symbols arranged in time series.

The search model provides the search unit 52 with data to be used for searching. An exemplary search model used by the search unit 52 is a weighted finite state transducer (WFST). In this case, the search unit 52 searches for an input symbol path that achieves the best accumulated value of the acoustic score by the Viterbi algorithm. Alternatively, the search model used by the search unit 52 may be the RNN or a network derived from RNN. By using such a search model, the search unit 52 can set restrictions on the path that can be searched as the input symbol path, designate a path to be prioritized at the time of search, or can designate input symbol string to be preferentially generated even when the acoustic score is not good. Furthermore, the search model includes information representing the correspondence between the input symbol string and the output symbol. In a case where the search model is WFST, the search unit 52 may store the input symbol path by a path on the WFST, that is, a combination of states and transitions of the WFST.

The input symbol acquisition unit 54 obtains the input symbol string generated by the search unit 52 by searching.

In a case where the search unit 52 generates M input symbol strings, the input symbol acquisition unit 54 obtains M input symbol strings.

The output symbol acquisition unit 56 obtains the output symbol obtained by the search unit 52 by searching. In a case where the search unit 52 generates a plurality of output symbols arranged in time series from one input symbol string, the output symbol acquisition unit 56 obtains a plurality of output symbols. Moreover, in a case where the search unit 52 generates M input symbol strings by searching, the output symbol acquisition unit 56 obtains the output symbol for each of the input symbol strings.

The correspondence acquisition unit 58 obtains correspondence information indicating a range corresponding to the output symbol in the input symbol string based on the input symbol string and the output symbol obtained by the search unit 52 by searching. In a case where the search unit 52 generates a plurality of output symbols arranged in time series from one input symbol string, the correspondence acquisition unit 58 obtains correspondence information for each of the output symbols. Moreover, in a case where the search unit 52 generates M input symbol strings, the output symbol acquisition unit 56 obtains correspondence information for each of the input symbol strings.

The input symbol storage unit 60 stores the input symbol string obtained by the input symbol acquisition unit 54. The output symbol storage unit 62 stores the output symbol obtained by the output symbol acquisition unit 56. The correspondence storage unit 64 stores the correspondence information obtained by the correspondence acquisition unit 58.

The additional symbol acquisition unit 66 reads the output symbol stored in the output symbol storage unit 62 and the correspondence information stored in the correspondence storage unit 64. Then, the additional symbol acquisition unit 66 obtains additional symbols representing paralinguistic information and/or non-linguistic information from among the input symbols included in the range corresponding to the output symbol in the input symbol string stored in the input symbol, storage unit 60. In a case where the search unit 52 generates a plurality of output symbols arranged in time series from one input symbol string, the additional symbol acquisition unit 66 obtains an additional symbol for each of the output symbols. Moreover, in a case where the search unit 52 generates M input symbol strings, the additional symbol acquisition unit 66 obtains an additional symbol for the output symbol included in each of the input symbol strings.

The output unit 68 outputs the output symbol and the obtained additional symbol in association with each other. In a case where the search unit 52 generates a plurality of output symbols arranged in time series the cutout unit 68 outputs the output symbols such that the time series of a plurality of output symbols can be identified, and outputs a corresponding additional symbol in association with each of the output symbols. In a case where the search unit 52 generates M input symbol strings, the output symbols and the obtained additional symbols are output in association with each other for the output symbol included in each of the input symbol strings.

Figure 4:
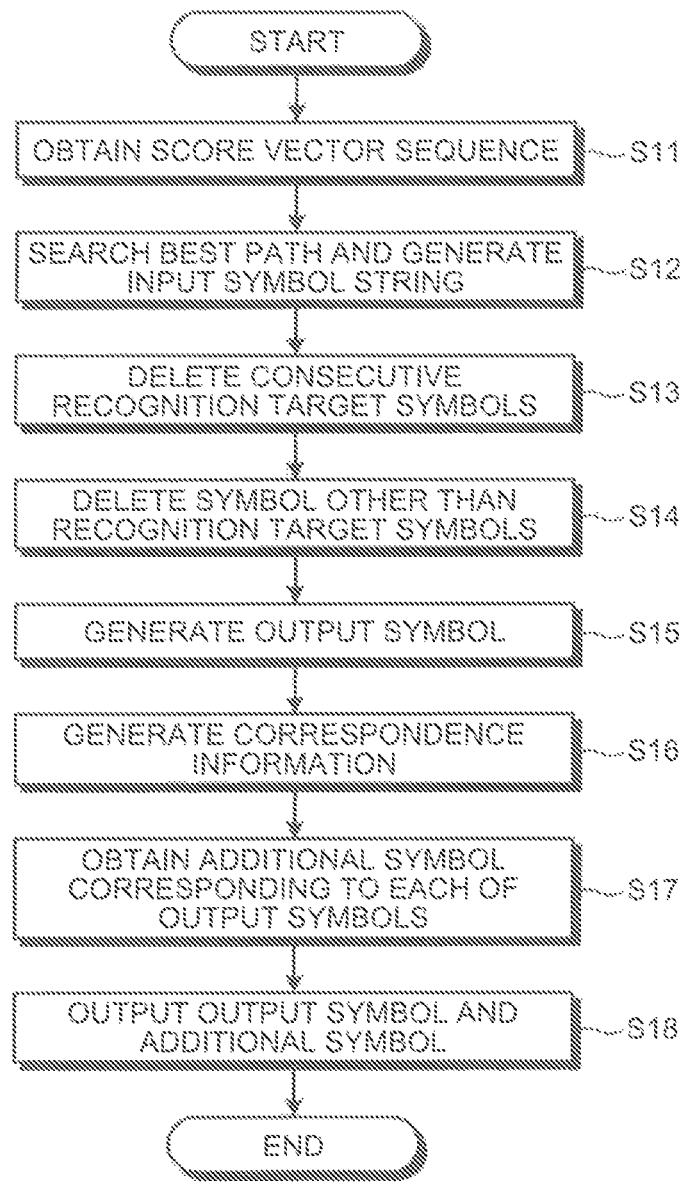
FIG. 4 is a diagram illustrating a processing flow of the path search unit.

FIG. 1 is a diagram illustrating a processing flow of the path search unit 30. The path search unit 30 executes processing in a procedure as illustrated in FIG. 4 in case of generating the best one input symbol string.

First, the path search unit 30 obtains a score vector sequence in S11. Subsequently, in S12, the path search unit 30 searches for a path of a highly likely input symbol based on the score vector sequence, and generates one input symbol string. For example, the path search unit 30 may generate an input symbol string by selecting and joining input symbols with the best acoustic score for each of the frames. Moreover, for example, the path search unit 30 may generate an input symbol string by searching for the best path by the Viterbi algorithm, or the like, using a search model such as WFST.

Subsequently, in S13, the path search unit 30 detects a portion having a plurality of consecutive recognition target symbols in the input symbol string, reserves one of the plurality of consecutive recognition target symbols, and deletes the other symbols. With this processing, the path search unit 30 can avoid duplicate recognition of the same linguistic information.

For example, the path search unit 30 reserves one head symbol among the plurality or consecutive recognition target symbols in the input symbol string, and deletes the second and subsequent symbols. Alternatively, the path search unit 30 may reserve last one symbol among the plurality of consecutive recognition target symbols in the input symbol string, and may delete the ether symbols.

Subsequently, in S14, the path search unit 30 reserves the recognition target symbol in the input symbol string after the processing of S13, and deletes the input symbol other than the recognition target symbol. That is, the path search unit 30 deletes the additional symbol and the non-target symbol from the input symbol string.

Subsequently, in S15, the path search unit 30 generates an output symbol from the input symbol string after undergoing the processing in S13 and S14. That is, the path search unit 30 generates the output symbol from the input symbol string including solely the recognition target symbol.

For example, the path search unit 30 sequentially extracts the output symbol that matches a portion of the input symbol string sequentially from the head of the input symbol string with reference to a search model that is a correspondence table between the input symbol string and the output symbol. For example of the search model as a correspondence table between the input, symbol string and the output symbol may be a phonetic dictionary that associates a phonetic symbol string with a word. Moreover, the path search unit 30 may generate a plurality of output symbols in time series from one input symbol string.

Note that the path search unit 30 may independently execute the processing in S12, S13, S14 and S15. Moreover, in a case where the search model is WFST, the path search unit 30 may collectively perform the processing in S12, S13, S14, and S15. In this case, the path search unit 30 stores a search result so as to be able to refer to the input symbol string and the output symbol later.

Subsequently, in S16, the path search unit 30 generates correspondence information for each of the output symbols. The correspondence information indicates a range corresponding to the output symbol in the input symbol string.

Note that the range corresponding to the output symbol in the input symbol string is a continuous range including all the recognition target symbols from which the output symbol is generated. Furthermore, the range corresponding to the output symbol in the input symbol string may be a range that is adjacent, on a boundary, to a range corresponding to another previous or next output symbol.

The path search unit 30 analyses the correspondence between the output symbol and the input symbol string and detects the boundary of the range. Alternatively, the path search unit 30 may detect the boundary based on the search model or other information.

Subsequently, in S17, the path search unit 30 obtains an additional symbol from the input symbols included in a range indicated by the correspondence information in the input symbol string for each of the output symbols. Subsequently, in S18, the path search unit 30 outputs the output symbol and the obtained additional symbol in association with each other.

The path search unit 30 may generate M input symbol strings. In this case, the path search unit 30 executes the processing in S12 to S18 for each of the input symbol strings. Moreover, in a case where the search model is WFST, the path search unit 30 can generate M input symbol strings by collectively executing the processing in S12 to 15.

FIGS. 5, 6, 7, 8, 9, and 10 are diagrams for illustrating processing content of the path search unit 30 in the case of recognizing alphabets. In the case of recognizing the alphabets in accordance with the processing flow in FIG. 4, the path search unit 30 executes the following processing.

In this case, the acoustic model is trained in advance by the learning device so as to recognize an alphabetical input symbol included in the symbol set. Moreover, while the recognition target symbol is a phonemic symbol in many cases, the acoustic model has learned to recognize the alphabets. Such a learning method is described in Alex Graves and Navdeep Jaitly, "Towards end-to-end speech recognition with recurrent neural networks", in Proceedings of the 31st International Conference on Machine Learning (ICML-14), 2014, pp. 1764-1772, for example.

For example, in S12, the path search unit 30 generates an input symbol string as illustrated in FIG. 5. Now, it is assumed, for example, that a predetermined symbol set is as follows.

Symbol set (set of input symbols)=(ε, a, d, g, h, o, <f>, <g>, <q>)

Moreover, it is assumed that the recognition target symbols among the input symbols are as follows.

Set of recognition target symbols=(a, d, g, h, o)

Moreover, it is assumed that the additional symbols among the input symbols are as follows. Note that ε is a symbol representing a filler among paralinguistic information. Moreover, <g> is a symbol representing a word fragment among non-linguistic information. <Q> is a symbol representing a question among paralinguistic information.

Set of additional symbols={<f>, <g>, <q>}

Moreover, it is assumed that the non-target symbols among the input symbols are as follows. Note that ε is a symbol indicating that which acoustic information among the acoustic information represented by the recognition target symbol and the additional symbol is included in the speech signal is undetermined.

non-target symbol=ε

In S13, the path search unit 30 reserves one head symbol among the plurality of consecutive recognition target symbols in the input symbol string, and deletes the second and subsequent symbols. For example, in the example of FIG. 6, both the third input symbol and the fourth input symbol are "a". Moreover, both the 13th input symbol end the 14th input symbol are "g". Accordingly, in S13, the path search unit 30 reserves the third input symbol and deletes the fourth input symbol. Moreover, she path search unit 30 reserves the 13th input symbol and deletes the 14th input symbol.

Subsequently, in S14, the path search unit 30 reserves the recognition target symbol in the input symbol string after the processing of S13, and deletes the input symbol other than the recognition target symbol. For example, as illustrated in the example of FIG. 7, the path search unit 30 deletes "<f>", "<g>", "<q>" and from the input symbol string, and reserves "a", "d", "g", "h", and "o".

Subsequently, the path search unit 30 sequentially extracts, in S15, the output symbol that matches a portion of the input symbol string sequentially from the head of the input symbol string, from the input symbol string that has undergone processing in S13 and S14 with reference to a search model that is a correspondence table between the input symbol string and the cutout symbol. For example, as illustrated in FIG. 8, the path search unit 30 generates three output symbols "$h_1$=ah", "$h_2$=g", and "$h_3$=good" from an input symbol string "ahggood". The subscript character of the output symbol "h" represents the order of generation of output symbols.

Subsequently, in S16, the path search unit 30 generates correspondence information for each of the output symbols. Note that the range corresponding to the output symbol in the input symbol string is a continuous range including all the recognition target symbols from which the output symbol is generated. Furthermore, the range corresponding to the output symbol in the input symbol string may be a range that is adjacent, on a boundary, to a range corresponding to another previous or next output symbol.

For example, in the example illustrated in FIG. 9, the corresponding range of the input symbol string for the first output symbol "$h_1$=ah" is a range from the first input symbol to the 12th input symbol. Moreover, the corresponding range of the input symbol string for the second output symbol "$h_2$=g" is a range from the 13th input symbol to the 18th input symbol. Moreover, the corresponding range of the input symbol string for the third output symbol "$h_3$=good" is a range from the 19th input symbol to the 32nd input symbol.

In the example of FIG. 9, the boundary on the leading side of the range is the head or the input symbol string in the case of the first output symbol, and the boundary on the leading side of the range is a portion immediately before the leading recognition target symbol corresponding to the output symbol in the case of the second and subsequent output symbols. Moreover, in the example of FIG. 9, the boundary at the ending side of the range is the last of the input symbol string in the case of the last output symbol, and the boundary at the ending side of the range is the same as the boundary on the leading side of the next output symbol in the case of the output symbol other than the last one. As a result, the path search unit 30 can set the range corresponding to the output symbol in the input symbol string as the range that is adjacent, on a boundary, to a range corresponding to another previous or next output symbol.

Note that the path search unit 30 defines, in S13, the boundary as illustrated in FIG. 9 in the case of reserving the leading symbol among the plurality of consecutive recognition target symbols and deleting the second and subsequent symbols. In contrast, in the case of reserving the last one of the plurality of consecutive recognition target symbols and deleting the others in S13, the boundary at the ending side of the range is the last of the input symbol string in the case of the last output symbol, and is immediately after the last recognition target symbol corresponding to the output symbol in the case of the output symbol other than the last one. Additionally, the boundary at the leading side of the range is the head of the input symbol string in the case of the first output symbol, and the boundary at the leading side of the range is the same as the boundary on the ending side of the preceding output symbol in the case or the second and subsequent output symbols.

Subsequently, in S17, the path search unit 30 obtains an additional symbol from the input symbols included in a range indicated by the correspondence information in the input symbol string for each of the output symbols.

For example, in the example in FIG. 10, "<f>" is included in the corresponding range (first to 12th) in the input symbol string at the first output symbol "$h_1$=ah". Accordingly, the path search unit 30 obtains "<f>" in association with the first output symbol "$h_1$=ah". Moreover, for example, "<g>" is included in the corresponding range (13th to 18th) of the input symbol string at the second output symbol "$h_2$=g". Accordingly, the path search unit 30 obtains "<g>" in association with the second output symbol "$h_2$=g". For example, "<q>" is included in the corresponding range (19th to 32nd) of the input symbol string at the third output symbol "$h_3$=good". Accordingly, the path search unit 30 obtains "<q>" in association with the second output symbol "$h_3$=good".

Subsequently, in S18, the path search unit 30 outputs the output symbol and the obtained additional symbol in association with each other. For example, in the case of the example of FIG. 10, the path search unit 30 outputs additional information "$p_1$={<f>}" including the obtained additional symbol in association with the first output symbol "$h_1$=ah". Moreover, the path search unit 30 outputs additional information "$p_2$={<g>}" including the obtained additional symbol in association with the second output symbol "$h_2$=g". Moreover, the path search unit 30 outputs additional information "$p_3$={<q>}" including the obtained additional symbol in association with the third output symbol "$h_3$=good".

FIG. 11 is a diagram illustrating an exemplary pseudo code representing recognition processing by the speech recognition apparatus 10. As an example, the speech recognition apparatus 10 executes the pseudo code illustrated in FIG. 11 sequentially from the first line.

In the first line, the speech recognition apparatus 10 substitutes $\xi_{initial}$ for $\xi$. $\xi$ stores a plurality of input symbol strings being searched and corresponding output symbols. For example, $\xi$ may store a WFST path searched by the Viterbi algorithm. $\xi_{initial}$ indicates an initial state of $\xi$. The speech recognition apparatus 10 can initialize $\xi$ by executing the first line.

The second line indicates that an integer from 1 to N is sequentially substituted for i and processing in the third to fifth lines is repeated each time the integer is substituted for i. i is a variable. N is the total number or frames of the speech signal. The speech recognition apparatus 10 executes the processing from the third to fifth lines for each of the first frame to the Nth frame of the speech signal.

In the third line, the speech recognition apparatus 10 substitutes the processing result of extract_features ($f_1$) for v. v is a variable that stores the feature vector. $f_1$ is the speech signal of the ith frame. extract_features($f_1$) is a function that calculates a feature vector from the speech signal of the ith frame. The speech recognition apparatus 10 can calculate the feature vector of the ith frame by executing the third line.

In the fourth line, the speech recognition apparatus 10 substitutes calc_scores(v) for s. s is a variable that stores the score vector. calc_scores(v) is a function that calculates the score vector from feature vectors. The speech recognition apparatus 10 can calculate the score vector of the ith frame by executing the fourth line.

In the fifth line, the speech recognition apparatus 10 substitutes she processing result of search ($\xi$, s) for $\xi$ search ($\xi$, s) is a function that obtains search results of input symbol strings and output symbols from a score vector sequence to which a new score vector has been added. By executing the fifth line, the speech recognition apparatus 10 can generate an input symbol string and an output symbol at the stage of searching from first to the ith frames. In a case where the WFST path is searched for by the Viterbi algorithm, the speech recognition apparatus 10 may extend the WFST path by one new score vector and store the path in ξ as a processing result.

Then, she speech recognition apparatus 10 can generate the input symbol string and the output symbol, as the results of speech signal recognition, by repeating the processing from the third to fifth lines until i=N is satisfied.

In the sixth line, the speech recognition apparatus 10 substitutes the processing result of best (ξ) for h. h is a variable that stores a set having elements being a combination of an output symbol and an index representing the order of the output symbol. best(ξ) is a function that obtains one or more output symbols held in ξ and the order of the individual output symbols. By executing the sixth line, the speech recognition apparatus 10 can obtain one or more output symbols as the speech signal recognition result and the order of the individual output symbols. In a case where the WFST path is searched for with the Viterbi algorithm, best (ξ) obtains one or more output symbols and the order of the individual output symbols from the path held in ξ.

In the seventh line, the speech recognition apparatus 10 substitutes an empty set for ψ. The symbol of slashed 0 in the figure represents an empty set. ψ is a variable that stores a set having elements being a combination of an index representing the order of the output symbol and a set of additional symbols corresponding to the output symbol. The speech recognition apparatus 10 can a ψ to be an empty set by executing the seventh line.

The eighth line indicates that an integer from 1 to |h| is sequentially substituted for i and processing in the ninth to 14th line is repeated each time the integer is substituted for i. |h| is the number of output symbols held in ψ. Accordingly, the speech recognition apparatus 10 executes processing from the ninth to 14th lines for each of the first to the |h|th output symbols.

In the ninth line, the speech recognition apparatus 10 substitutes an empty set for A. A is a set of additional symbols. The speech recognition apparatus 10 can allow A to be an empty set by executing the ninth line.

In line 10, the speech recognition apparatus 10 substitutes get_symbol_sequence (h$_i$) for n. n is a set of input symbols, get_symbol_sequence(h$_i$) is a function that obtains one or more input symbols included in the range corresponding to the ith output symbol in the input symbol string held in ξ. By executing the tenth line, the speech recognition apparatus 10 can obtain one or more input symbols included in the range corresponding to the ith output symbol in the input symbol string. In a case where the WFST path is searched for by the Viterbi algorithm, get_symbol_sequence(h$_i$) obtains one or mere input symbols included in the portion corresponding to the ith output symbol among the paths held ξ.

The 11th line indicates that the processing in the 12th to 13th lines are executed for every σ, which is an element included in R\L. R is a set including all recognition target symbols and ail additional symbols, i is a set including all recognition target symbols, R\L is a set obtained by removing L from R. That is, R\L is a set including all the additional symbols. Accordingly, the speech recognition apparatus 10 repeatedly executes the processing in the 12th to the 13th lines for each of all the additional symbols.

In the 12th line, the speech recognition apparatus 10 judges whether σ is included in n. In a case where the speech recognition apparatus 10 judges that σ is included in n, the speech recognition apparatus 10 executes the 13th line.

In 13th line, the speech recognition apparatus 10 substitutes σ for A. Accordingly, by executing the 12th and 13th lines, the speech recognition apparatus 10 can obtain additional symbols included in the range corresponding to the ith output symbol in the input symbol string.

In the 14th line, the speech recognition apparatus 10 adds a combination of i, which is an index representing the order of output symbols, and A, which is a set of additional symbols, to ψ. With this processing, the speech recognition apparatus 10 can add the additional symbol corresponding to the ith output symbol to ψ.

In the 15th line, the speech recognition apparatus 10 returns h and ψ to a higher order program. With this processing, the speech recognition apparatus 10 can output a plurality of output symbols and additional symbols corresponding to the individual output symbols.

FIG. 12 is a diagram illustrating exemplary alphabetical symbols recognized by the pseudo code in FIG. 11. A of FIG. 12 illustrates an exemplary case including a symbol set (a set of input symbols) Σ, a set of recognition target symbols L, a set of recognition target symbols and additional symbols R, and a set of additional symbols R\L. B of FIG. 12 illustrates an exemplary input symbol string π$_h$. C in FIG. 12 illustrates exemplary output symbols h$_1$, h$_2$, and h$_3$.

The range corresponding to the first output symbol "$_1$=ah" in the input symbol string "π$_h$" illustrated in FIG. 12 is assumed to be, for example, as follows, εεaa<f>εεh<f>εε

In this case, execution of the tenth line of the pseudo code for h$_1$ would lead to: π="εεaa<f>εεh<f>εε". Subsequently, execution of the 11th to 13th lines of the pseudo code are for h$_1$ would lead to: A={<f>}. Subsequently, execution of the 14th line would lead to: ψ={1, (<f>)}. With this processing, the application using the result recognized by the speech recognition apparatus 10 can identify that the first output symbol is a filler.

Moreover, it is assumed that the range corresponding to the second output symbol "h$_2$=g" in the input symbol string "π$_h$" is, for example, as follows.

ggεε<g>ε

In this case, execution of the tenth line of the pseudo code for h$_2$ would lead to: π="ggϑε<g>ε". Subsequently, execution of the 11th to 13th lines of the pseudo code for h$_2$, would lead to: A={<g>}. Subsequently, execution of the 14th line would lead to: ψ=(2, {<g>}). With this processing, the application using the result recognized by the speech recognition apparatus 10 can identify that the second output symbol is a word fragment.

Moreover, it is assumed that the input symbol string corresponding to the second output symbol "h$_2$=g" is, for example, as follows.

ggεε<g>ε<f>ε

This leads to ψ=(2, {<f>, <g>}), and a plurality of additional symbols is included. With this processing, the application using the result recognized by the speech recognition apparatus 10 can identify that the second output symbol is a filler and a word fragment.

Moreover, it is assumed that the range corresponding to the third output symbol "h$_3$=good" in the input symbol string "π$_h$" is, for example, as follows.

gεoεεεoεdε<q>εεε

In this case, execution of the tenth line of the pseudo code for $h_3$ would lead to: n="gεo εεεoεdε<q>εεε". Subsequently, execution of the 11th to 13th lines of the pseudo code for $h_3$ would lead to: A={<q>}. Subsequently, execution of the 14th line would lead to: ψ=(3, {<q>}). With this processing, the application using the result recognized by the speech recognition apparatus 10 can identify that the third output symbol is a question.

As described above, with the speech recognition apparatus 10 according to the present embodiment, it is possible to recognize the linguistic information included in the speech signal and the paralinguistic information and/or non-linguistic information accompanying the linguistic information. Moreover, with the speech recognition apparatus 10, it is possible to output the output symbol corresponding to the recognized linguistic information and additional symbol corresponding to paralinguistic information accompanying the recognized linguistic information and/or the non-linguistic information in association with each other.

First Modification Example

In a first modification example, the output unit 68 may output the output symbol and all the input symbols included in the range corresponding to the output symbol in the input symbol string in association with each other. In this case, the application that uses the result recognized by the speech recognition apparatus 10 analyses whether an additional symbol is included in one or more input symbols received.

For example, (i,A) in the 14th line of the pseudo code in FIG. 11 is replaced with (i,n). With this processing, the speech recognition apparatus 10 can output the output symbol and all the input symbols included in the range corresponding to the output symbol in the input symbol string in association with each other. Moreover, in this case, the application that uses the result recognized by the speech recognition apparatus 10 executes processing corresponding to the 11th to 13th lines of the pseudo code in FIG. 11. With this processing, the application can obtain the additional symbol corresponding to each of the output symbols.

Second Modification Example

FIG. 13 is a diagram illustrating an exemplary pseudso code representing recognition processing by the speech recognition apparatus 10 according to a second modification example. In the second modification example, the additional symbol acquisition unit 66 calculates reliability of the obtained additional symbol based on the number of additional symbols included in the range corresponding to the output symbol in the input symbol string. Then, the output unit 68 outputs the calculated reliability together with the corresponding additional symbol.

For example, the additional symbol acquisition unit 66 calculates the ratio of she number of additional symbols included in the range corresponding to the output symbol in the input symbol string to the number of recognition target symbols included in the range corresponding to the output symbol in the input symbol string, as the reliability. With this processing, the application using the result recognized by the speech recognition apparatus 10 can use paralinguistic information or non-linguistic information in accordance with the reliability.

The speech recognition apparatus 10 according to the second modification example sequentially executes, for example, the pseudo code illustrated in FIG. 13 from the first line. The pseudo code illustrated in FIG. 13 is a code obtained by changing a portion of the pseudo code illustrated in FIG. 11. Specifically, the 12th and 13th lines of the pseudo code illustrated in FIG. 11 are replaced with the 12th to 19th lines of the pseudo code illustrated in FIG. 13. Moreover, the 14th and 15th lines of the pseudo code illustrated in FIG. 11 are replaced with the 20th and 21st lines of the pseudo code illustrated in FIG. 13. Hereinafter, description will follow focusing on the difference.

The 11th line indicates that, the processing in the 12th to 20th lines is executed for every σ, which is an element included in R\L. Accordingly, the speech recognition apparatus 10 repeatedly executes the processing in the 12th to 20th lines for each of the additional symbols.

In the 12th line, the speech recognition apparatus 10 substitutes 0 four c and 0 for d. Both c and d are variables.

In the 13th line, an integer from 1 to |n| is sequentially substituted for j and the processing in the 14th to 17th lines is repeated each time the integer is substituted for j. |n| is the number of input symbols included in the range corresponding to the ith output symbol in the input symbol string. Accordingly, the speech recognition apparatus 10 executes processing in the 14th to 17th lines for each of the first to |n| input symbols included in the range corresponding to the ith output symbol in the input symbol string.

In the 14th line, the speech recognition apparatus 10 judges whether $n_j$ and o are identical. $n_j$ is the jth input symbol in the range corresponding to the ith output symbol in the input symbol string. The speech recognition apparatus 10 executes the 15th line in a case where $n_j$ and o are identical; and skips the 15th line in a case where they are not identical.

In the 15th line; the speech recognition apparatus 10 adds one to c.

In the 16th line, the speech recognition, apparatus 10 judges whether $n_j$ is included in L. L is a set including ail recognition target symbols. That is, the speech recognition apparatus 10 judges whether $n_j$ is any of the recognition target symbols. In a case where $n_j$ is included in L, the speech recognition apparatus 10 executes the 17th line, and skips the 17th line if it is not included.

In the 17th line, the speech recognition apparatus 10 adds one to d.

In the 18th line, the speech recognition apparatus 10 judges whether c is greater than 0. In the 18th line; c represents the number of additional symbols specified by o included in the range corresponding to the ith output symbol in the input symbol string. Accordingly, by executing the 18th line, the speech recognition apparatus 10 judges whether the additional symbol specified by o is included in the range corresponding to the ith output symbol in the input symbol string. In a case where it is included (c is greater than 0), the speech recognition apparatus 10 executes the 13th line, and in a case where it is net included (c is 0), skips the 19th line.

In the 19th line, the speech recognition apparatus 10 substitutes a combination of σ and c/d into A. c/d is the number of additional symbols; specified by σ included in the range corresponding to she ith output symbol in the input symbol string, with respect to the number of recognition target symbols included in the range corresponding to the ith output symbol in the input symbol string. That is, c/d represents the reliability of σ which is an additional symbol. Accordingly, by executing the 19th line, the speech recognition apparatus 10 can obtain a combination of the additional symbol included in the range corresponding to the ith output symbol in the input symbol string and the reliability of the additional symbol.

In the 20th line, the speech recognition apparatus 10 adds, to ψ, a combination of i, which is an index representing the order of output symbols, and A which is a set of the combination of the additional symbol and reliability. With this processing, the speech recognition apparatus 10 can add a combination of the additional symbol and reliability corresponding to the ith output symbol, to ψ.

At the 21st line, the speech recognition apparatus 10 returns h and ψ to a program calling this pseudo code. With this processing, the speech recognition apparatus 10 can output a plurality of output symbols, and additional symbol and reliability corresponding to each of the output symbols Third Modification Example The additional symbol acquisition unit 66 according to a third modification example calculates reliability of the obtained additional symbol based on the position of the additional symbol included in the range corresponding to the output symbol in the input symbol string. For example, the additional symbol acquisition unit 66 may calculate such that at the more back in the range corresponding to the output symbol in the input symbol string the additional symbol is positioned, the higher the reliability of the additional symbol. In contrast, the additional symbol acquisition unit 66 may calculate such that, in the more front in the range corresponding to the output symbol in the input symbol string the additional symbol is positioned, the higher the reliability of the additional symbol.

For example, the 15th line in the pseudo code in FIG. 13 is replaced as follows. With this arrangement, the speech recognition apparatus 10 may calculate such that at the more back in the range corresponding to the output symbol in the input symbol string the additional symbol is positioned, the higher the reliability of the additional symbol.

$c \leftarrow c+j$

Moreover, for example, the 15th line in the pseudo code in FIG. 13 is replaced as follows. With this arrangement, the speech recognition apparatus 10 may calculate such that at more front in the range corresponding to the output symbol in the input symbol string the additional symbol is positioned, the higher the reliability of the additional symbol.

$c \leftarrow c+|n|-j+1$

Fourth Modification Example

FIG. 14 is a diagram illustrating an exemplary pseudo code representing recognition processing by the speech recognition apparatus 10 according to a fourth modification example.

In the fourth modification example, the additional symbol acquisition unit 66 obtains an additional symbol included in a predetermined position within a range corresponding to the output symbol in the input symbol string. For example, the additional symbol acquisition unit 66 obtains an additional symbol included in the range corresponding to the output symbol in the input symbol string, being included posterior to the last recognition target symbol. With this arrangement, the application using the result recognized by the speech recognition apparatus 10 can use paralinguistic information or non-linguistic information extracted from the acoustic information after the linguistic information is uttered. Note that the additional symbol acquisition unit 66 may obtain the additional symbol from any of the positions within the range corresponding to the output symbol in the input symbol string as long as it is a predetermined position.

The speech recognition apparatus 10 according to the fourth modification example sequentially executes the pseudo code illustrated in FIG. 14 from the first line, for example. The pseudo code illustrated in FIG. 14 is a code obtained by changing a portion of the pseudo code illustrates in FIG. 11. Specifically, the 12th and 13th lines of the pseudo code illustrated in FIG. 11 are replaced with the 12th to 16th lines of the pseudo code illustrated in FIG. 14. Moreover, the 14th and 15th lines of the pseudo code illustrated in FIG. 11 are replaced with the 17th and 18th lines of the pseudo code illustrated in FIG. 13. Hereinafter, description will follow focusing on the difference.

On the 12th line, an integer from |n| to 1 is sequentially substituted for j while decrementing the value one by one and the processing in the 13th to 16th lines is repeated each time the integer is substituted for j. |n| is the number of input symbols included in the range corresponding to the ith output symbol in the input symbol string. Accordingly, the speech recognition apparatus 10 executes, sequentially from the input symbol at the back, processing in the 13th to 16th lines for each of the |n|th to the first input symbols included in the range corresponding to the ith output symbol in the input symbol string.

In the 13th line, the speech recognition apparatus 10 judges whether $n_j$ is included in L. L is a set including ail recognition target symbols. $n_j$ is the jth input symbol in the range corresponding to the ith output symbol in the input symbol string. That is, the speech recognition apparatus 10 judges whether $n_j$ is any of the recognition target symbols. In a case where $n_j$ is included in L, the speech, recognition apparatus 10 executes the 14th line, and skips the 14th line in a case where it is not included.

In the 14th line, the speech recognition apparatus 10 suspends the repetitive processing in the 13th to 16th lines and returns the processing to the 11th line.

In the 15th line, the speech recognition apparatus 10 judges whether $n_j$ and σ are identical. In a case where $n_j$ and σ are identical, the speech recognition apparatus 10 executes the 16th line, and skips the 16th line when they are not identical.

In the 16th line, the speech recognition apparatus 10 substitutes σ for A.

In the 17th line, the speech recognition apparatus 10 adds a combination of i, which is an index representing the order of output symbols, and A which, is a set of additional symbols, to ψ. With, this processing, the speech recognition apparatus 10 can add the additional symbol included in the range corresponding to the output symbol in the input symbol string, which is included posterior to the last recognition target symbol, to ψ.

The additional symbol acquisition unit 66 may obtain the additional symbol anterior to the first recognition target symbol within the range corresponding to the output symbol in the input symbol string. In this case, for example, the 12th line in the pseudo code of FIG. 14 is replaced as follows. Accordingly, the speech recognition apparatus 10 executes, sequentially from the input symbol at the front, processing in the 13th to 16th lines for each of the first to |n|th input symbols included in the range corresponding to the ith output symbol in the input symbol string.

for j from 1 to |n|

Moreover, the additional symbol acquisition unit 66 may obtain the additional symbol between the center position and the end within the range corresponding to the output symbol in the input symbol string. In this case, the 13th and 14th lines in the pseudo code in FIG. 14 are removed, and the 12th line is replaced as follows. With this processing, the speech recognition apparatus 10 executes processing in the 15th to 16th lines for each of input symbols ranging from the center position to |n|th input symbols included in the range corresponding to the ith output symbol in the input symbol string.

for j cell (|n|/2) to |n|

Note that cell (|n|/2) is a function that rounds up the decimal point of |n|/2. The additional symbol acquisition unit 66 may obtain the additional symbol from any of the positions within the range corresponding to the output symbol in the input symbol string as long as it is a position that can be specified, by the code.

Figure 15:
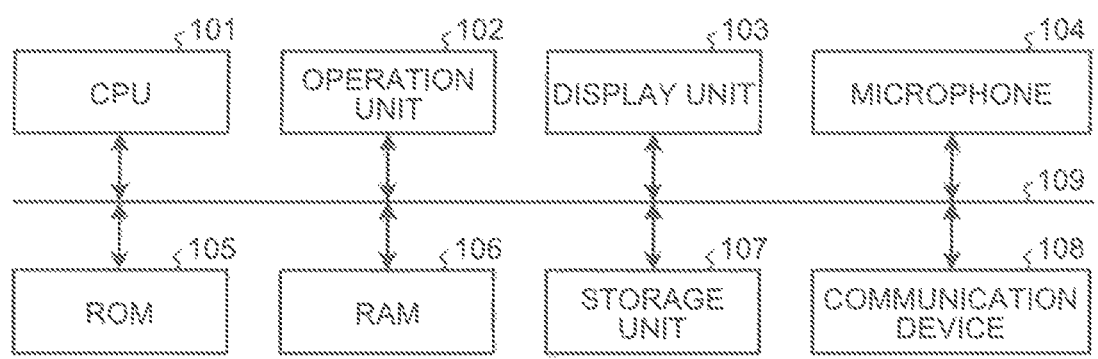
FIG. 15 is a hardware block diagram of a speech recognition apparatus.

FIG. 15 is a hardware block diagram of the speech recognition apparatus 10. As an example, the speech recognition apparatus 10 is realized with a hardware configuration similar to the case of a general computer (information processing apparatus). The speech recognition apparatus 10 includes a central processing unit (CPU) 101, an operation unit 102, a display unit 103, a microphone 104, a read only memory (ROM) 105, a random access memory (RAM) 106, a storage unit 107, a communication device 108, and a bus 109. The individual components are connected with each other by the bus 109.

The CPU 101 executes various types of processing in cooperation with various programs prestored in the ROM 105 or the storage unit 107 using a predetermined area of the RAM 106 as a work area, and integrally controls operation of individual components constituting the speech recognition apparatus 10 (the feature extraction unit 22, score calculation unit 26, and the path search unit 30 (including the input symbol acquisition unit 54, the output symbol acquisition unit 56, the correspondence acquisition unit 58, the additional symbol acquisition unit 66, and the output unit 63). Moreover, the CPU 101 realizes the operation unit 102, the display unit 103, the microphone 104, the communication device 108, or the like, in cooperation with the program prestored in the ROM 105 or the storage unit 107.

The operation unit 102 is aa input device such as a mouse and a keyboard, accepts information input by a user as an instruction signal, and outputs the instruction signal to the CPU 101.

The display unit 103 is a display device such as a liquid crystal display (LCD). The display unit 103 displays various types of information based on a display signal from the CPU 101. For example, the display unit 103 displays output symbols, additional symbols, or the like. Note that in a case where output symbols, additional symbols, or the like, are output to the communication device 108, the storage unit 107, or the lite, the speech recognition apparatus 10 need not include the display unit 103.

The microphone 104 is a device for inputting a speech signal. In a case where pattern recognition of a prerecorded speech signal or a speech signal input from the communication device 108 is performed, the speech recognition apparatus 10 need not include the microphone 104.

The ROM 105 non-rewritably stores a program used for controlling the speech recognition apparatus 10, various setting information, or the like. The RAM 106 is a volatile storage medium, such as a synchronous dynamic random access memory (SDRAM). The RAM 106 functions as a work area of the CPU 101. Specifically, it functions as a buffer, or the like, for temporarily storing various variables and parameters used by the speech recognition apparatus 10.

The storage unit 107 is a rewritable recording device such as a semiconductor storage medium such as a flash memory or a magnetically or optically recordable storage medium. The storage unit 107 stores a program used for controlling the speech recognition apparatus 10, various setting information, or the like. Moreover, the storage unit 107 stores information stored in the acoustic model storage unit 24, the search model storage unit 28, the input symbol storage unit 60, the output symbol storage unit 62, the correspondence storage unit 64, or the like.

The communication device 108 communicates with an external device and is used for outputting output symbols, additional symbols, or the like. In the case of performing pattern recognition of a prerecorded speech signal or a speech signal input from she microphone 104 and in a case where output symbols and additional symbols or the like are output to the display unit 103 or the storage unit 107, the speech recognition apparatus 10 need not include the comunication device 108.

The program executed by the speech recognition apparatus 10 of the present embodiment is recorded and provided in a computer-readable recording medium such as a CD-ROM, a flexible disk (FD), a CD-R, a digital versatile disk (DVD) in a file in an installable format or an executable format.

Moreover, the program executed by the speech recognition apparatus 10 of the present embodiment may be stored on a computer connected to a network such as the Internet and provided by being downloaded via the network. Moreover, the program executed by the speech recognition apparatus 10 of the present embodiment may be provided or distributed via a network such as the Internet. Moreover, the program executed by the speech recognition apparatus 10 of the present embodiment may be provided by being incorporated in a ROM, or the like, in advance.

The program executed by the speech recognition apparatus 10 of the present embodiment has a module configuration including a feature extraction module, a score calculation module, and a path search module (including an input symbol acquisition module, an output symbol acquisition module, a correspondence acquisition module, an additional symbol acquisition module, and an output module) described above. The CPU 101 (processor) reads a program from a storage medium, or the like, and executes the program, whereby the above-described modules are loaded on a main storage device, and the feature extraction unit 22, the score calculation unit 26, and the path search unit 30 (including the input symbol acquisition unit 54, the output symbol acquisition unit 56, the correspondence acquisition unit 58, the additional symbol acquisition unit 66, and the output unit 68) are generated on the main storage unit. A portion or all of the feature extraction unit 22, the score calculation unit 26, and the path search unit 30 may be configured by hardware.

While certain embodiments have been described, these embodiments have been presented by way of example only, and are not intended to limit the scope of the inventions. Indeed, the newel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech recognition apparatus comprising:
one or more processors configured to:
calculate, based on a speech signal, a score vector sequence including a plurality of score vectors including an acoustic score for each of input symbols as an element of a predetermined symbol set being arranged;
generate an input symbol string by searching for a path of the input symbol tracing the acoustic score having a high likelihood in the score vector sequence and generate at least one output symbol representing a recognition result of the speech signal based on a recognition target symbol representing linguistic information as a recognition target among the input symbols included in the input symbol string;
obtain at least one additional symbol representing paralinguistic information and/or non-linguistic information from among the input symbols included in a range corresponding to each of the at least one output symbol in the input symbol string;
calculate reliability of the at least one obtained additional symbol, the reliability being calculated based on at least one of:
 a number of the at least one obtained additional symbol included in the range corresponding to the output symbol in the input symbol string, or
 a position of the at least one obtained additional symbol included in the range corresponding to the output symbol in the input symbol string; and
output the at least one output symbol, the obtained additional symbol corresponding to each of the at least one output symbol, and the reliability corresponding to the additional symbol.

2. The apparatus according to claim 1, wherein
the input symbol represents acoustic information included in the speech signal, and
the acoustic score represents a likelihood of that the acoustic information represented by the corresponding input symbol is included in the speech signal.

3. The apparatus according to claim 2, wherein
the paralinguistic information is information that cannot be identified from the linguistic information and that has been added to the speech signal by utterance of a speaker, and
the non-linguistic information is information representing a feature of the speaker, included in the speech signal.

4. The apparatus according to claim 3, wherein
each of the linguistic information, the paralinguistic information, and the non-linguistic information is one among the acoustic information, and
the symbol set includes the recognition target symbol and the additional symbol, as the input symbol.

5. The apparatus according to claim 4, wherein silence information is one among the acoustic information, and
the symbol set further includes a silence symbol representing the silence information as the recognition target symbol.

6. The apparatus according to claim 4, wherein a non-target symbol is a symbol representing that which of the acoustic information is included in the speech signal among the acoustic information represented by the recognition target symbol and the additional symbol is undetermined, and the symbol set further includes the non-target symbol as the input symbol.

7. The apparatus according to claim 1, wherein in outputting, the processors output a plurality of the output symbols generated based on the input symbol string.

8. The apparatus according to claim 7, wherein the processors are further configured to obtain correspondence information indicating the range corresponding to the output symbol in the input symbol string for each of the output symbols, in obtaining of the additional symbol, the processors obtain, for each of the output symbols, the additional symbol from among the input symbols included in a range indicated by the correspondence information in the input symbol string.

9. The apparatus according to claim 8, wherein the range corresponding to the output symbol in the input symbol string is a continuous range including all the recognition target symbols from which the output symbol is generated.

10. The apparatus according to claim 9, wherein the range corresponding to the output symbol in the input symbol string is a range that is adjacent, on a boundary, to a range corresponding to another previous or next output symbol.

11. The apparatus according to claim 1, wherein in obtaining of the additional symbol, the processors calculate reliability of the obtained additional symbol based on the number of the at least one obtained additional symbol included in the range corresponding to the output symbol in the input symbol string, and in outputting, the processors output the reliability together with the corresponding additional symbol.

12. The apparatus according to claim 1, wherein in obtaining of the additional symbol, the processors calculate reliability of the obtained additional symbol based on the position of the at least one obtained additional symbol included in the range corresponding to the output symbol in the input symbol string, and in outputting, the processors output the reliability together with the corresponding additional symbol.

13. The apparatus according to claim 1, wherein in obtaining of the additional symbol, the processors obtain the additional symbol included in a predetermined position within the range corresponding to the output symbol in the input symbol string.

14. The apparatus according to claim 13, wherein in obtaining of the additional symbol, the processors obtain the additional symbol included within the range corresponding to the output symbol in the input symbol string, being included posterior to the last recognition target symbol.

15. The apparatus according to claim 1, wherein in generating of the input symbol string, the processors search for the score vector sequence and generate one input symbol string.

16. The apparatus according to claim 1,
wherein the processors are configured to:
in generating of the input symbol string, search for the score vector sequence and generate M (M is an integer of two or more) input symbol strings,
in generating of the output symbol, generate the output symbol for each of the input symbol strings,
in obtaining of the additional symbol, obtain the additional symbol for each of the input symbol strings, and
in outputting, output the output symbol and the additional symbol in association with each other for each of the input symbol strings.

17. A speech recognition method comprising:
calculating, by using an information processing apparatus, based on a speech signal, a score vector sequence including a plurality of score vectors including an acoustic score for each of input symbols as an element of a predetermined symbol set being arranged;
generating, by using the information processing apparatus, an input symbol string by searching for a path of the input symbol tracing the acoustic score having a high likelihood in the score vector sequence and generating at least one output symbol representing a recognition result of the speech signal based on a recognition target symbol representing linguistic information as a recognition target among the input symbol included in the input symbol string;

obtaining, by using the information processing apparatus, at least one additional symbol representing paralinguistic information and/or non-linguistic information from among the input symbols included in a range corresponding to each of the at least one output symbol in the input symbol string;

calculating, by using the information processing apparatus, reliability of the at least one obtained additional symbol, the reliability being calculated based on at least one of:
- a number of the at least one obtained additional symbol included in the range corresponding to the output symbol in the input symbol string, or
- a position of the at least one obtained additional symbol included in the range corresponding to the output symbol in the input symbol string; and outputting, by using the information processing apparatus, the at least one output symbol, the obtained additional symbol corresponding to each of the at least one output symbol, and the reliability corresponding to the additional symbol.

18. A computer program product comprising a non-transitory computer-readable medium including programmed instructions, wherein the instructions, when executed by a computer, cause the computer to perform:

calculating, based on a speech signal, a score vector sequence including a plurality of score vectors including an acoustic score for each of input symbols as an element of a predetermined symbol set being arranged;

generating an input symbol string by searching for a path of the input symbol tracing the acoustic score having a high likelihood in the score vector sequence and generating at least one output symbol representing a recognition result of the speech signal based on a recognition target symbol representing linguistic information of a recognition target among the input symbols included in the input symbol string;

obtaining at least one additional symbol representing paralinguistic information and/or non-linguistic information from among the input symbols included in a range corresponding to each of the at least one output symbol in the input symbol string;

calculating reliability of the at least one obtained additional symbol, the reliability being calculated based on at least one of:
- a number of the at least one obtained additional symbol included in the range corresponding to the output symbol in the input symbol string, or
- a position of the at least one obtained additional symbol included in the range corresponding to the output symbol in the input symbol string; and outputting the at least one output symbol, the obtained additional symbol corresponding to each of the at least one output symbol, and the reliability corresponding to the additional symbol.

* * * * *